(12) United States Patent
Hirabayashi et al.

(10) Patent No.: US 11,722,030 B2
(45) Date of Patent: Aug. 8, 2023

(54) MOTOR AND ROTATING DEVICE

(71) Applicant: MINEBEA MITSUMI Inc., Nagano (JP)

(72) Inventors: Koichiro Hirabayashi, Kitasaku-gun (JP); Bora In, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 89 days.

(21) Appl. No.: 17/421,928

(22) PCT Filed: Oct. 10, 2019

(86) PCT No.: PCT/JP2019/040053
§ 371 (c)(1),
(2) Date: Jul. 9, 2021

(87) PCT Pub. No.: WO2020/148952
PCT Pub. Date: Jul. 23, 2020

(65) Prior Publication Data
US 2022/0109343 A1 Apr. 7, 2022

(30) Foreign Application Priority Data

Jan. 16, 2019 (JP) .................................. 2019-005211

(51) Int. Cl.
*H01R 39/40* (2006.01)
*H02K 5/14* (2006.01)
(Continued)

(52) U.S. Cl.
CPC ............. *H02K 5/148* (2013.01); *H01R 39/40* (2013.01); *H02K 5/225* (2013.01); *H02K 7/1166* (2013.01)

(58) Field of Classification Search
CPC ........ H02K 5/146; H02K 5/148; H02K 13/10; H01R 39/40
See application file for complete search history.

(56) References Cited

U.S. PATENT DOCUMENTS 2,555,997 A * 6/1951 Portail ................. H01R 39/646
310/248
3,955,113 A * 5/1976 Hillyer ................... H01R 39/40
310/245
(Continued)

FOREIGN PATENT DOCUMENTS

JP H06-165443 A 6/1994
JP 2002-051509 A 2/2002
(Continued)

OTHER PUBLICATIONS

International Search Report for corresponding International Application No. PCT/JP2019/040053 dated Dec. 24, 2019.
(Continued)

*Primary Examiner* — Dang D Le
(74) *Attorney, Agent, or Firm* — Pearne & Gordon LLP

(57) ABSTRACT

A motor according to an embodiment includes a commutator provided to a rotation shaft, a brush in contact with the commutator, a bracket having a wall surface opposing the brush, and a deformable portion in contact with the brush and the wall surface. The bracket includes a protrusion provided on the commutator side with respect to the deformable portion. The protrusion protrudes from the wall surface toward the brush.

17 Claims, 16 Drawing Sheets

(51) Int. Cl.
*H02K 5/22* (2006.01)
*H02K 7/116* (2006.01)

(56) References Cited

U.S. PATENT DOCUMENTS

| | | | | |
|---|---|---|---|---|
| 5,753,995 | A | * | 5/1998 | Ogino .................... H01R 39/58 |
| | | | | 310/239 |
| 5,949,173 | A | | 9/1999 | Wille et al. |
| 8,917,001 | B2 | * | 12/2014 | Mao ....................... H02K 13/10 |
| | | | | 310/90 |
| 2008/0012446 | A1 | | 1/2008 | Akabane |
| 2009/0066185 | A1 | | 3/2009 | Kurasawa |

FOREIGN PATENT DOCUMENTS

| | | |
|---|---|---|
| JP | 2008-022619 A | 1/2008 |
| JP | 2009-071925 A | 4/2009 |
| JP | 2016-127733 A | 7/2016 |
| JP | 2017-073918 A | 4/2017 |
| JP | 2017-073950 A | 4/2017 |

OTHER PUBLICATIONS

Written Opinion for corresponding International Application No. PCT/JP2019/040053 dated Dec. 24, 2019.
English translation of the Written Opinion for corresponding International Application No. PCT/JP2019/040053 dated Dec. 24, 2019.

* cited by examiner

MOTOR AND ROTATING DEVICE

CROSS-REFERENCE TO RELATED APPLICATIONS

This application is a U.S. National Stage application that claims the benefit of PCT Application PCT/JP2019/040053, filed on Oct. 10, 2019, which claims the benefit of Japanese Application 2019-005211 filed Jan. 16, 2019, the entire disclosures of which are hereby incorporated herein by reference.

TECHNICAL FIELD

The present invention relates to a motor and a rotating device.

BACKGROUND ART

In the related arts, there is known a motor including damper members fixed to each of a bent part of a brush and a brush holder in order to reduce vibration of the brush and reduce noise.

CITATION LIST

Patent Literature

Patent Literature 1: JP 2008-22619 A

SUMMARY OF INVENTION

Technical Problem

However, in the above-described motor, for example, vibration of the brush may cause the damper members to move toward a rotation shaft of the motor, i.e., toward a tip end of the brush in contact with a commutator. This movement may hinder electrical contact between the brush and the commutator.

This problem is an example of problems to be solved by the present invention, and an object of the present invention is to provide a motor and a rotating device improved in terms of noise reduction and electrical contact between a brush and a commutator.

Solution to Problem

A motor according to an aspect of the present invention includes a commutator provided to a rotation shaft, a brush in contact with the commutator, a bracket having a wall surface opposing the brush, and a deformable portion in contact with the brush and the wall surface. The bracket includes a protrusion provided on the commutator side with respect to the deformable portion. The protrusion protrudes from the wall surface toward the brush.

DESCRIPTION OF EMBODIMENTS

Figure 1:
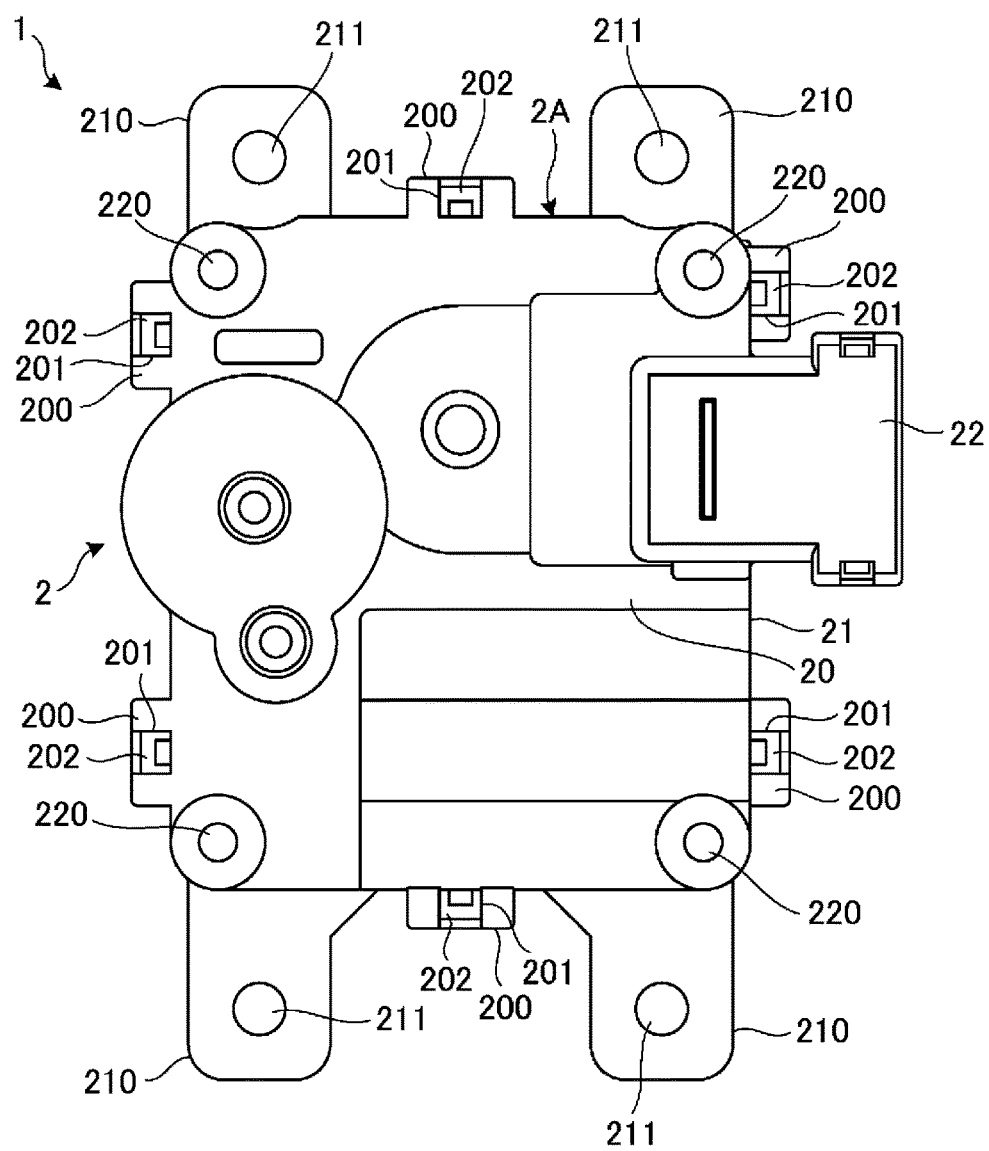
FIG. 1 is a plan view of a rotating device according to an embodiment.

A motor and a rotating device according to an embodiment will be described below with reference to the drawings. The motor according to the embodiment is provided in the rotating device.

Note that the embodiment described below is not intended to limit the application of the motor and the rotating device. Furthermore, it should be noted that the drawings are schematic drawings and the dimensional relationships, proportions, and the like between elements in the drawings may differ from reality. In addition, among the drawings, the dimensional relationships and proportions may not necessarily be the same.

Figure 2:
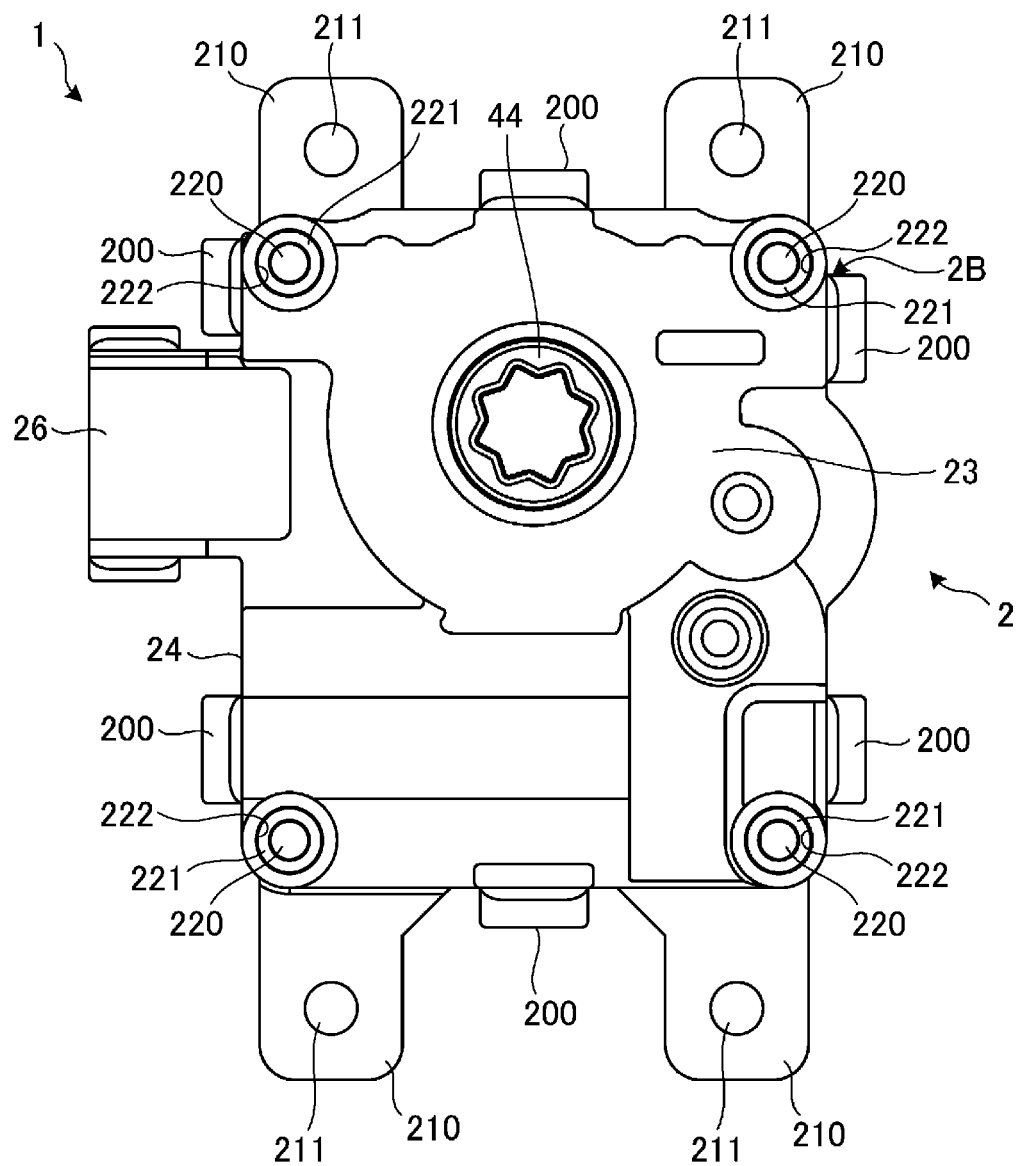
FIG. 2 is a bottom view of the rotating device according to the embodiment.
Figure 3:
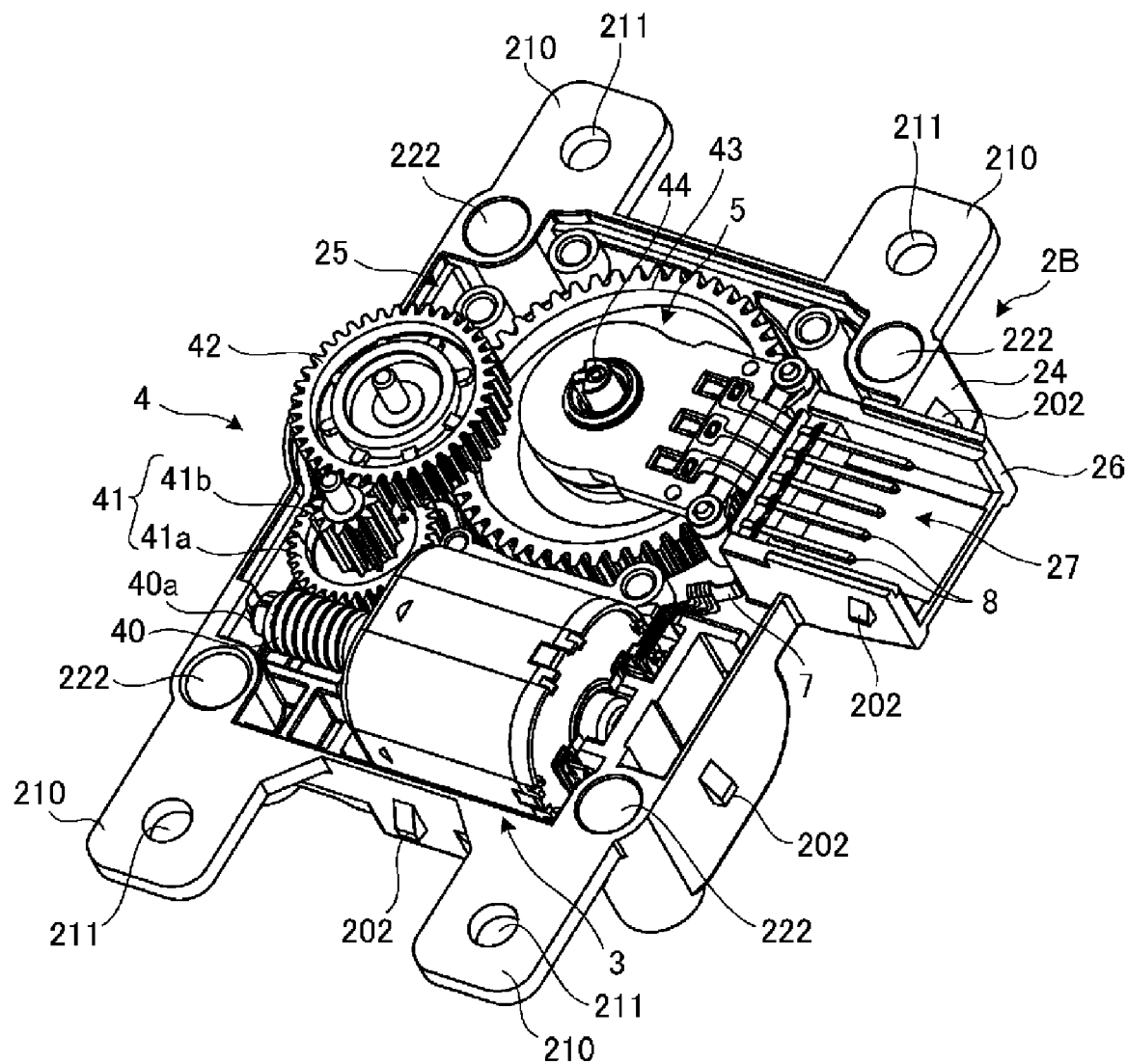
FIG. 3 is a perspective view of the rotating device according to the embodiment when a first casing is removed.
Figure 4:
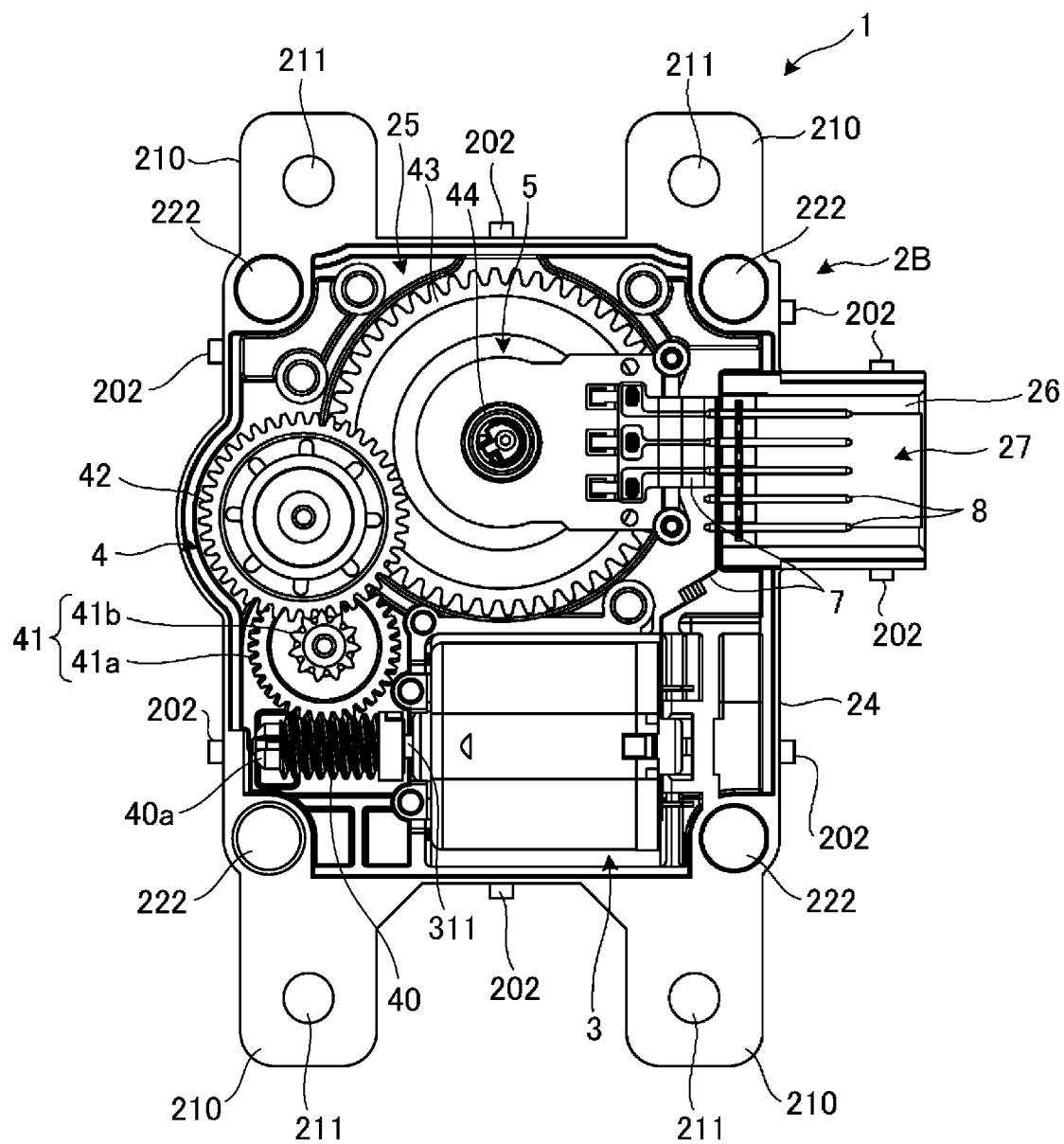
FIG. 4 is a plan view of the rotating device according to the embodiment when the first casing is removed.

A rotating device 1 according to the embodiment will be described with reference to FIGS. 1 to 4. FIG. 1 is a plan view of a rotating device 1 according to the embodiment. FIG. 2 is a bottom view of the rotating device 1 according to the embodiment. FIG. 3 is a perspective view of the rotating device 1 according to the embodiment when a first casing 2A is removed. FIG. 4 is a plan view of the rotating device 1 according to the embodiment when the first casing 2A is removed.

The rotating device 1 can be suitably used as an actuator used in an air conditioning system for a vehicle, for example, and can control the turning operation of louvers for controlling air flow or the like.

The rotating device 1 includes a casing 2, a motor 3, a set of gears 4 (gear mechanism), and a rotation angle detection sensor 5.

The casing 2 includes a first casing 2A and a second casing 2B. The casing 2 accommodates the motor 3, the set of gears 4, and the rotation angle detection sensor 5.

The first casing 2A includes a first surface portion 20 forming a top surface portion of the casing 2, and a first side wall portion 21 provided at an outer peripheral portion of the first surface portion 20. An opening (not illustrated) surrounded by the first side wall portion 21 is formed in the first casing 2A so as to oppose the first surface portion 20. Further, a first insertion portion 22 for receiving an external connector (not illustrated) is formed in the first side wall portion 21 of the first casing 2A.

The second casing 2B includes a second surface portion 23 forming a bottom surface portion of the casing 2, and a second side wall portion 24 provided at an outer peripheral portion of the second surface portion 23. An opening 25 surrounded by the second side wall portion 24 is formed in the second casing 2B so as to oppose the second surface portion 23. Further, a second insertion portion 26 for receiving an external connector (not illustrated) is formed in the second side wall portion 24 of the second casing 2B.

The casing 2 is formed by the first casing 2A and the second casing 2B being coupled together in a state where the opening of the first casing 2A and the opening 25 of the second casing 2B oppose each other. A connector for accommodating an external connector is formed by the first insertion portion 22 and the second insertion portion 26 being coupled together. Note that the casing 2 is formed of a resin material such as polypropylene, polyethylene terephthalate, or ABS.

Further, in the first casing 2A, a plurality of engagement portions 200 each extending toward the second casing 2B are integrally formed at an outer peripheral portion of the first side wall portion 21. Each of the engagement portions 200 is provided with an engagement recess 201. On the other hand, in the second casing 2B, a plurality of projections 202 (hereinafter, referred to as engagement projections 202) each corresponding to one of the plurality of engagement portions 200 of the first casing 2A are integrally formed on the second side wall portion 24. The engagement projections 202 engage with the engagement recesses 201 of the engagement portions 200.

Note that, in the present embodiment, although the engagement portions 200 are provided in the first casing 2A and the engagement projections 202 are provided in the second casing 2B, the engagement portions may be provided in the second casing 2B and the engagement projections may be provided in the first casing 2A.

In addition, a tab 210 (hereinafter, referred to as an attachment tab 210) that protrudes outward is formed at each end portion of one side of each of the first casing 2A and the second casing 2B. The attachment tab 210 is provided with a coupling hole 211 for receiving a predetermined fastener (not illustrated) inserted through the coupling hole 211. The first casing 2A and the second casing 2B are securely coupled together with the predetermined fasteners via four coupling holes 211.

Further, in the first casing 2A, cylindrical protrusions 221 protruding from the first surface portion 20 are formed. Each of the cylindrical protrusions 221 has a first through-hole 220 for receiving a fastener such as a bolt or a screw (not illustrated) inserted through the first through-hole 220. The second casing 2B is provided with second through-holes 222. The protrusions 221 are fitted into the second through-holes 222.

The motor 3 may be a known motor such as a stepping motor or a brushless motor. In the illustrated example, the motor 3 is a DC motor, and a worm 40 included in the set of gears 4 is attached to a rotation shaft 311 of the motor 3. Electric power is supplied to the motor 3 from the external connector via a connection terminal 8 and a flexible substrate 7. The connection terminal 8 is provided in an insertion port 27 formed by the first insertion portion 22 of the first casing 2A and the second insertion portion 26 of the second casing 2B. The configuration of the motor 3 will be described below.

The set of gears 4 includes the worm 40, a first transmission gear 41, a second transmission gear 42, and an output gear 43 (a rotating body). The worm 40 rotates with the rotation shaft 311 of the motor 3. A top portion 40a of the worm 40 on the side opposite to the motor 3 is rotatably supported by the second casing 2B.

Rotation of the worm 40 is transmitted to a helical gear 41a of the first transmission gear 41 and is transmitted to the second transmission gear 42 via a small diameter gear 41b being coaxially provided with the helical gear 41a and having a relatively small diameter compared to the helical gear 41a. The rotation of the second transmission gear 42 is transmitted to the output gear 43. An output shaft 44 is connected to the output gear 43. The rotation of the motor 3 is decelerated at a predetermined deceleration rate and output from the output shaft 44 to the outside.

The rotation angle detection sensor 5 detects the rotation angle of the output gear 43 to control the rotation angle of the output gear 43.

Figure 5:
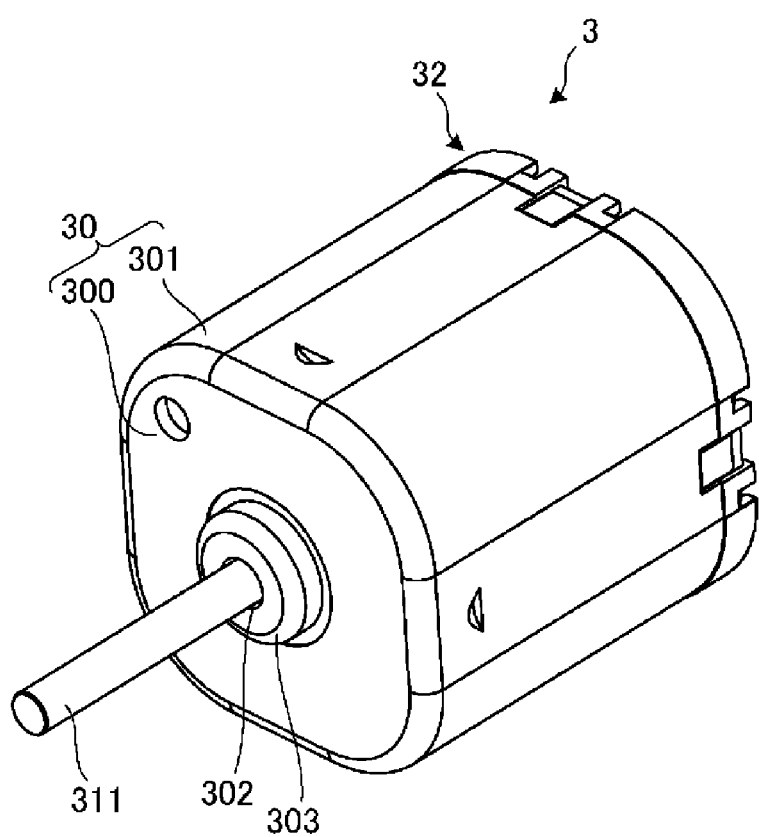
FIG. 5 is a perspective view of a motor.
Figure 6:
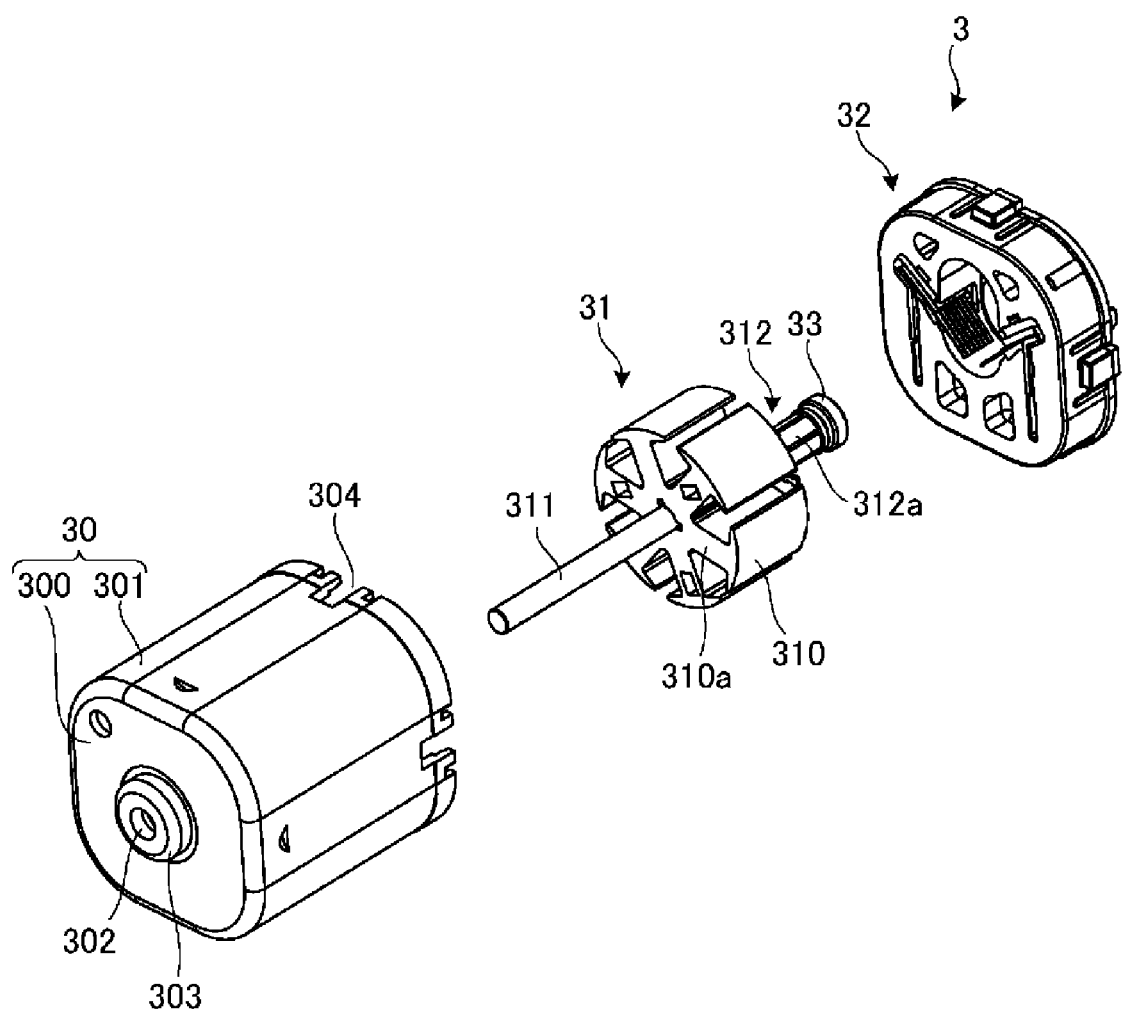
FIG. 6 is an exploded perspective view of the motor.

Next, the motor 3 will be described with reference to FIGS. 5 and 6. FIG. 5 is a perspective view of the motor 3. FIG. 6 is an exploded perspective view of the motor 3.

The motor 3 includes a frame 30, a plurality of magnets (not illustrated), an armature 31, and a bracket 32.

The frame 30 includes a bottom portion 300 and a cylindrical portion (hereinafter, referred to as a side wall portion) 301 provided along the peripheral edge of the bottom portion 300.

A bearing portion 303 protruding outward in the direction of the rotational axis is formed on the bottom portion 300. A hole 302 for guiding the rotation shaft 311 of the armature 31 (the rotation shaft 311 of the motor 3) to the outside is formed in the bearing portion 303. Note that a bearing (not illustrated) rotatably supporting the rotation shaft is provided inside the bearing portion 303.

The side wall portion 301 is formed so as to surround the outer periphery of the armature 31. In addition, an opening 304 is formed in the side wall portion 301 on a side opposite to the bottom portion 300. On an inner wall surface (not illustrated) of the side wall portion 301 opposing the armature 31, the plurality of magnets are disposed so as to be spaced apart from the armature 31.

The armature 31 includes a core 310, a coil (not illustrated) wound around each of a plurality of poles 310a of the core 310, the rotation shaft 311 fixed to the core 310, and a commutator 312.

The core 310 is formed by a plurality of metal plates layered in the axial direction of the rotation shaft 311. Examples of the metal plate include a magnetic steel sheet. The rotation shaft 311 is disposed at the center of the core 310 so as to pass through the core 310.

The commutator 312 is provided at the outer peripheral surface of the rotation shaft 311. Specifically, the commutator 312 is provided along the circumferential direction of the rotation shaft 311. The commutator 312 includes a plurality of sheet metals 312a provided at an end portion of the rotation shaft 311 opposite to the end portion of the rotation shaft 311 guided out of the motor 3.

The sheet metals 312a are connected to the end portions of the coils wound around the poles 310a of the core 310, using solder or the like. Note that, the end portion of the rotation shaft 311 on the commutator 312 side is rotatably supported by a bearing 33.

Figure 7:
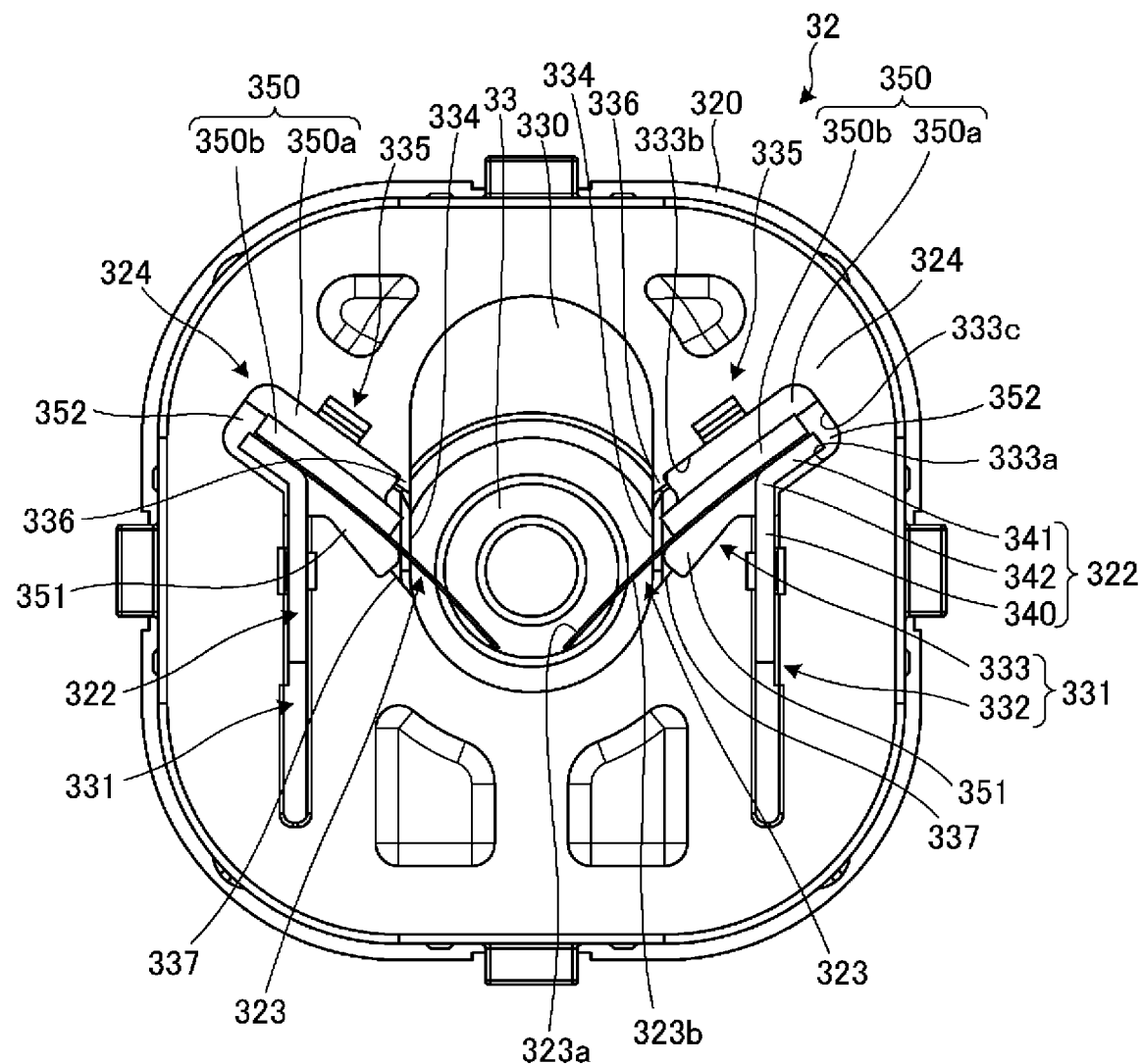
FIG. 7 is a front view of a bracket as viewed from a frame side.
Figure 8:
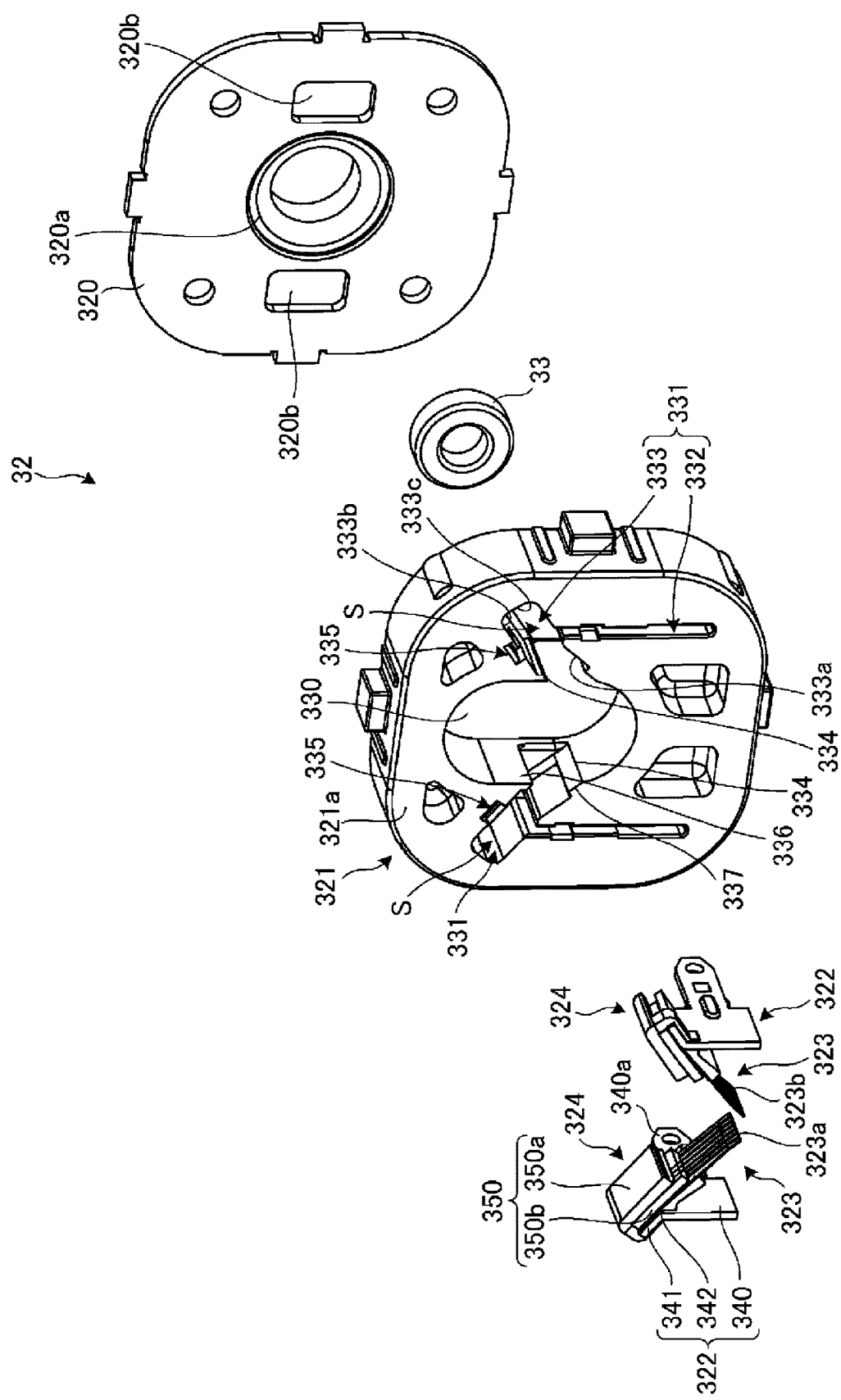
FIG. 8 is an exploded perspective view of the bracket.

Next, the bracket 32 will be described with reference to FIGS. 7 and 8. FIG. 7 is a front view of the bracket 32 as viewed from the frame 30 side. FIG. 8 is an exploded perspective view of the bracket 32. The bracket 32 includes a bearing plate 320, a bracket main body (hereinafter, referred to as a main body) 321, a pair of terminal portions 322, a pair of brushes 323, and a pair of deformable portions 324.

The plate (hereinafter, referred to as a bearing plate) 320 is attached to the main body 321 from a side opposite to the frame 30 (see FIGS. 5 and 6). A bearing portion 320a is formed at the center of the bearing plate 320. The bearing portion 320a is recessed toward the side opposite to the main body 321, and the bearing 33 is accommodated in the bearing portion 320a. In addition, a pair of holes (hereinafter, referred to as insertion holes) 320b are formed in the bearing plate 320 such that the bearing portion 320a is located between the pair of holes. End portions 340a of the terminal portions 322 are inserted into the insertion holes 320b.

Figure 9:
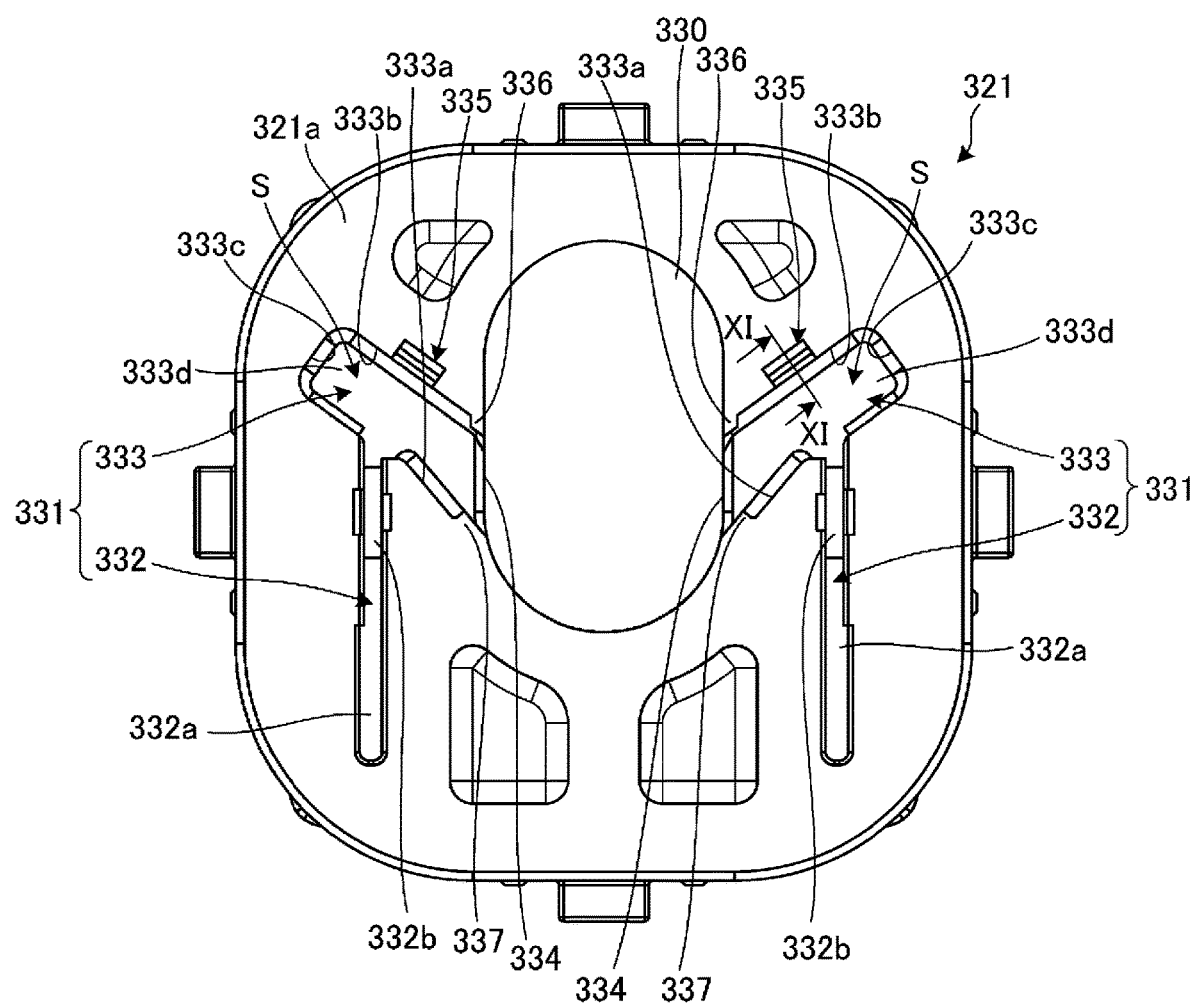
FIG. 9 is a front view of the bracket as viewed from the frame side.
Figure 10:
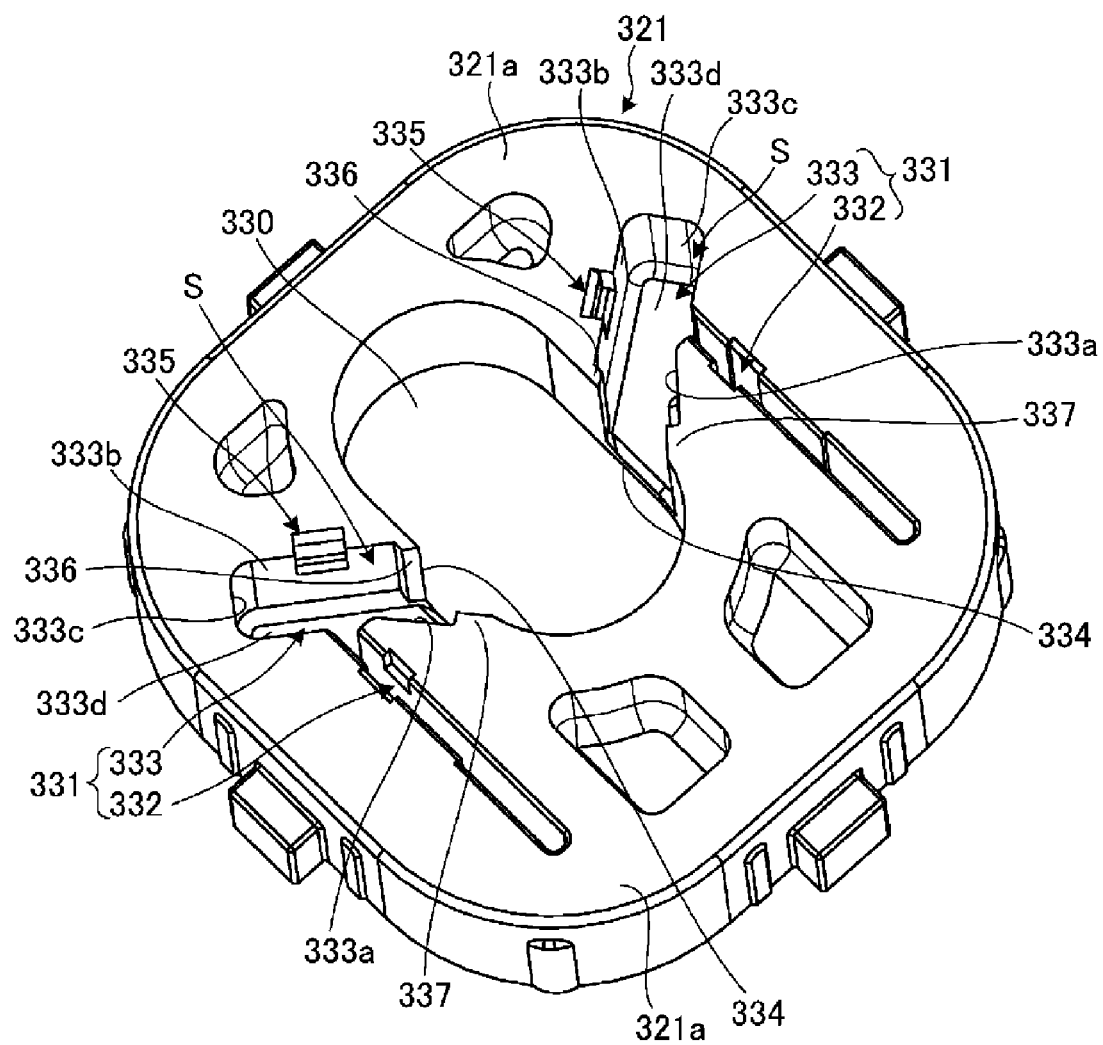
FIG. 10 is a perspective view of the bracket as viewed from the frame side.

Here, the main body 321 will be described with reference to FIGS. 7 to 10. FIG. 9 is a front view of the main body 321 as viewed from the frame 30 side. FIG. 10 is a perspective view of the main body 321 as viewed from the frame 30 side.

The main body 321 is configured to have a thickness along the axial direction of the rotation shaft 311 (see FIG. 6). A hole (hereinafter, referred to as an insertion hole) 330 and a pair of accommodating portions 331 are formed in the main body 321. The commutator 312 (see FIG. 6) is disposed in the insertion hole 330, and the terminal portions 322, portions of the brushes 323, and the deformable portions 324 are accommodated in the pair of accommodating portions 331.

The insertion hole 330 has an elongated circle shape and is formed along the axial direction of the rotation shaft 311. The commutator 312 is inserted into the insertion hole 330 along with the rotation shaft 311.

The accommodating portions 331 are formed so as to be recessed from a top surface 321a on the core 310 side (hereinafter, referred to as a front wall) along the axial direction of the rotation shaft 311, specifically, from the front wall 321a toward the bearing plate 320. Each of the accommodating portions 331 is formed of a first accommodating portion 332 and a second accommodating portion 333 so as to have a T-shape when viewed from the core 310 side.

The first accommodating portion 332 is formed along the longitudinal direction of the insertion hole 330 having an elongated circle shape. A hole (hereinafter, referred to as an insertion hole) 332b is formed in a bottom portion 332a of the first accommodating portion 332, and the end portion 340a of each terminal portion 322 is inserted into the insertion hole 332b.

The second accommodating portion 333 is formed so as to intersect with the first accommodating portion 332, and one end portion of the first accommodating portion 332 is connected to a first side wall surface 333a (second wall surface). In other words, the first accommodating portion 332 and the second accommodating portion 333 communicate with each other. An opening 334 is formed in an end portion of the second accommodating portion 333 on the commutator 312 side such that the second accommodating portion 333 and the insertion hole 330 communicate with each other. The opening 334 is open to the bearing plate 320 and the armature 31. Furthermore, the opening 334 forms parts of the openings of the first accommodating portion 332 and the second accommodating portion 333, and parts of these openings are open to the armature 31. A recess 335 is formed in a second side wall surface 333b (first wall surface) of the second accommodating portion 333 opposing the first side wall surface 333a. A third side wall surface 333c opposing the insertion hole 330 or a space S in the second accommodating portion 333 is formed in the second accommodating portion 333, and the first side wall surface 333a and the second side wall surface 333b are connected by the third side wall surface 333c.

Figure 11:
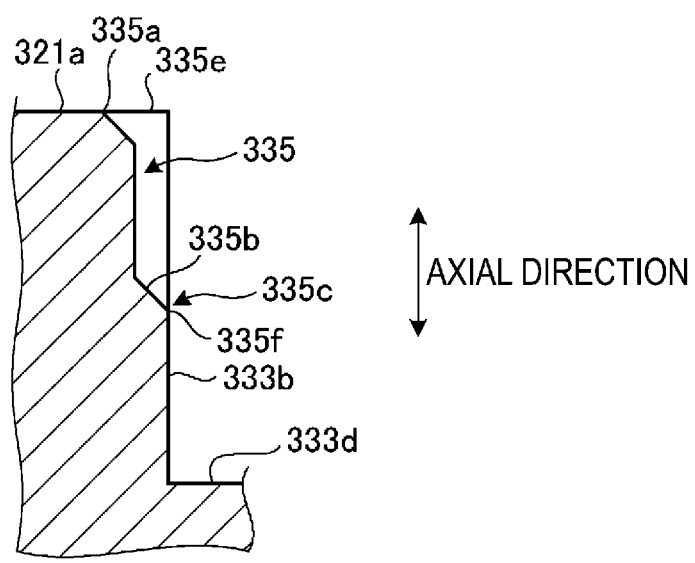
FIG. 11 is a schematic cross-sectional view taken along XI-XI in FIG. 9.

As illustrated in FIG. 11, an opening 335a forming a part of the opening 334 is formed at a first end portion 335e of the recess 335 in the axial direction of the rotation shaft 311 of the motor 3, specifically, at the first end portion 335e on the front wall 321a side. In other words, in the axial direction of the rotation shaft 311, the recess 335 has the first end portion 335e and a second end portion 335f, where the first end portion 335e forms the opening 335a, and the second end portion 335f has an inclined surface 335b. The first end portion 335e is an end portion on the front wall 321a side, and the second end portion 335f is an end portion on a bottom portion 333d side of the second accommodating portion 333. FIG. 11 is a schematic cross-sectional view taken along XI-XI in FIG. 9. The recess 335 is formed to reach to a middle portion 335c of the second side wall surface 333b, in the axial direction of the rotation shaft 311. In other words, the recess 335 is formed along the axial direction of the rotation shaft 311 from the front wall 321a, and the second end portion 335f on the side opposite to the front wall 321a is formed to be located on the front wall 321a side with respect to the bottom portion 333d of the second accommodating portion 333, and is at the middle portion 335c of the second side wall surface 333b (a part of the wall surface) in the axial direction of the rotation shaft 311.

Note that in the recess 335, the inclined surface 335b is formed at the second end portion 335f on the side opposite to the front wall 321a. The inclined surface 335b is formed so as to increase in distance from the opening 335a in the axial direction of the rotation shaft 311 further toward the second accommodating portion 333.

As illustrated in FIGS. 8 to 10, the main body 321 includes a first protrusion 336 and a second protrusion 337. The first protrusion 336 and the second protrusion 337 are formed at the end portion of the second accommodating portion 333 on the commutator 312 side. The first protrusion 336 and the second protrusion 337 are formed so as to oppose each other. The first protrusion 336 and the second protrusion 337 form a part of the space S of the second accommodating portion 333 or the opening 334.

Specifically, the first protrusion 336 protrudes from the second side wall surface 333b toward the brush 323, and is provided on the commutator 312 side with respect to a first resin portion 350a of a first deformable portion 350 forming the deformable portion 324. In addition, the second protrusion 337 protrudes from the first side wall surface 333a toward the brush 323, and is provided on the commutator 312 side with respect to an end portion on the commutator 312 side of a second deformable portion 351 forming the deformable portion 324. The first protrusion 336 and the second protrusion 337 are in contact with an end portion of the deformable portion 324 on the commutator 312 side, in the radial direction.

As illustrated in FIGS. 7 and 8, a first end portion 340 and a second end portion 341 are formed in each terminal portion 322. Furthermore, a bent portion 342 is formed between the first end portion 340 and the second end portion 341 in each terminal portion 322. An L-shaped metal plate is subjected to a bending process or the like to form each terminal portion 322 into a bent shape.

The first end portion 340 is accommodated in the first accommodating portion 332 of the main body 321. The end portion 340a of the first end portion 340 on the side opposite to the core 310 (see FIG. 6) is inserted into the insertion hole 332b (see FIG. 9) of the first accommodating portion 332 and the insertion holes 320b of the bearing plate 320, and protrudes from the bearing plate 320. The first end portion 340 protruding from the bearing plate 320 is electrically connected to the external connector via the flexible substrate 7 (see FIG. 3) and the connection terminal 8 (see FIG. 3).

The second end portion 341 is accommodated in the second accommodating portion 333 of the main body 321. The second end portion 341 is formed so as to extend toward the side opposite to the insertion hole 330 of the main body 321 with respect to the first end portion 340, i.e., toward a radially outer side of the rotation shaft 311. Each brush 323 is attached to the second end portion 341.

Each brush 323 has a plate shape and is deformable and electrically conductive. Each brush 323 has a contact surface 323a in contact with the commutator 312. Each brush 323 is attached to the second end portion 341 of the terminal portion 322. Note that a lubricant is present between the contact surface 323a and the commutator 312. This lubricant is provided as a member different from the above-described first resin portion 350a and may be a known lubricant.

The deformable portion 324 is accommodated in the second accommodating portion 333. Each deformable portion 324 includes the first deformable portion 350, the second deformable portion 351, and a third deformable portion 352. Each deformable portion 324 has a restoring force, and has a function of dampening vibration of the brush 323.

The first deformable portion 350 is provided between the brush 323 and the second side wall surface 333b (first wall surface) of the second accommodating portion 333 opposing the brush 323. Specifically, the first deformable portion 350 is provided between the second side wall surface 333b and the surface of the brush 323 in contact with the commutator 312. The first deformable portion 350 includes the first resin portion 350a and a second resin portion 350b.

The first resin portion 350a is formed of a gel. The gel is, for example, a two-part curing type gel, an ultraviolet curing type gel, or a thermosetting type gel. The gel is injected from a nozzle (not illustrated) of a dispenser inserted into the recess 335 formed in the second side wall surface 333b of the second accommodating portion 333. The first resin portion 350a is in contact with the second side wall surface 333b.

An end portion of the first resin portion 350a on the commutator 312 side is in contact with the first protrusion 336 of the main body 321. As a result, the first protrusion 336 prevents the first resin portion 350a from moving toward the commutator 312. In other words, the first protrusion 336 functions as a stopper for preventing the first resin portion 350a from flowing toward the commutator 312.

The second resin portion 350b has a flat plate shape, and is formed of a rubber used, for example, as an elastic member having elasticity. The second resin portion 350b is harder than the first resin portion 350a. The second resin portion 350b is provided between the brush 323 and the first resin portion 350a. The second resin portion 350b is fixed to the brush 323. An end portion of the second resin portion 350b on the commutator 312 side protrudes toward the commutator 312 with respect to the end portion of the first resin portion 350a on the commutator 312 side, and supports the end portion of the first resin portion 350a on the commutator 312 side. Thus, the end portion of the first resin portion 350a on the commutator 312 side is prevented from moving toward the commutator 312 by the first protrusion 336, while being prevented from deforming toward the brush 323 by being supported by the second resin portion 350b.

The second deformable portion 351 is provided on the commutator 312 side with respect to the terminal portion 322, and is provided between the first side wall surface 333a (second wall surface) of the second accommodating portion 333 and the brush 323. Specifically, the second deformable portion 351 is provided between the first side wall surface 333a and a surface 323b of the brush 323 opposite to the contact surface 323a in contact with the commutator 312. The second deformable portion 351 is formed of a gel. Note that the second deformable portion 351 is formed of a member more deformable with respect to the first deformable portion 350.

An end portion of the second deformable portion 351 is in contact with the second protrusion 337 of the main body 321, and thus is prevented from moving toward the commutator 312 by the second protrusion 337. In other words, the second protrusion 337 functions as a stopper for preventing the second deformable portion 351 from flowing toward the commutator 312.

The second deformable portion 351 is provided such that an end portion of the second deformable portion 351 on the commutator 312 side is located on the commutator 312 side with respect to the end portion of the first deformable portion 350 on the commutator 312 side. In other words, the second protrusion 337 is located on the commutator 312 side with respect to the end portion of the first deformable portion 350 on the commutator 312 side. The second deformable portion 351 supports the end portion of the first deformable portion 350 on the commutator 312 side with the brush 323 interposed between the second deformable portion 351 and the end portion of the first deformable portion 350 on the commutator 312 side.

The third deformable portion 352 is provided radially opposite to the second deformable portion 351, with respect to the terminal portion 322. Specifically, the third deformable portion 352 is provided between the terminal portion 322 and the first side wall surface 333a of the second accommodating portion 333. Thus, the terminal portion 322 is disposed as a separating member separating the third deformable portion 352 from the second deformable portion 351. An end portion of the third deformable portion 352 on the side opposite to the commutator 312 is provided so as to extend between the terminal portion 322 and the third side wall surface 333c of the second accommodating portion 333, toward the first deformable portion 350. In other words, the third deformable portion 352 is formed along the first side wall surface 333a and the third side wall surface 333c of the second accommodating portion 333. The third deformable portion 352 is provided so as to surround the terminal portion 322 and the brush 323 located on the side opposite to the commutator 312.

The third deformable portion 352 is formed of a gel. The third deformable portion 352 may include the same member as the first resin portion 350a of the first deformable portion 350 or the second deformable portion 351, or may be formed of a different member. Note that the third deformable portion 352 may be formed integrally with the first resin portion 350a of the first deformable portion 350. In addition, the gel for forming the second deformable portion 351 and the third deformable portion 352 may be injected via the recess 335 by a dispenser, similarly to the first resin portion 350a of the first deformable portion 350.

The motor 3 includes the brushes 323 being in contact with the commutator 312 and being accommodated in the accommodating portions 331 formed in the main body 321, and the deformable portions 324 each in contact with the first side wall surface 333a, the second side wall surface 333b, and the third side wall surface 333c of each accommodating portion 331. Further, in the main body 321, the first protrusion 336 and the second protrusion 337 each protruding toward the brush 323 are provided on the commutator 312 side with respect to the deformable portion 324. Specifically, the main body 321 is provided with the first protrusion 336 protruding from the first side wall surface 333a toward the brush 323, and the second protrusion 337 protruding from the second side wall surface 333b toward the brush 323.

With this configuration, the deformable portion 324 on the commutator 312 side, specifically, the first resin portion 350a of the first deformable portion 350 is in contact with the first protrusion 336, and an end portion of the second deformable portion 351 is in contact with the second protrusion 337. As a result, in the motor 3, the deformable portion 324 can be prevented from flowing to the commutator 312, and thus the deformable portion 324 can be prevented from flowing toward the contact point between the commutator 312 and the brush 323. Thus, in the motor 3, better electrical contact between the brush 323 and the commutator 312 can be achieved.

In addition, as a result of providing the deformable portions 324 in the motor 3, the vibration of the brush 323 can be dampened, and thus better noise reduction can be achieved.

In addition, in the main body 321, the recess 335 is formed in the second side wall surface 333b being a part of the wall surface in contact with the deformable portion 324. The opening 335a is formed at the first end portion 335e of the recess 335 in the axial direction of the rotation shaft 311 of the motor 3.

With this configuration, a gel can be supplied to the second accommodating portion 333 by a nozzle of a dispenser inserted into the recess 335, and the nozzle of the dispenser can be prevented from coming into contact with the brush 323. Thus, deformation of the brush 323 can be prevented.

Further, in the axial direction of the rotation shaft 311, the first end portion 335e of the recess 335 forms the opening 335a, and the second end portion 335f of the recess 335 forms the inclined surface 335b.

With this configuration, when the gel is supplied from the nozzle of the dispenser, the gel can flow toward the second accommodating portion 333, and thus the gel can be prevented from overflowing from the recess 335.

Further, the second end portion 335f of the recess 335 is located at the middle portion 335c being a part of the second side wall surface 333b, in the axial direction of the rotation shaft 311. In other words, the recess 335 is formed so as not to reach the bottom portion 333d of the second accommodating portion 333.

With this configuration, the gel supplied from the nozzle of the dispenser can flow from the middle portion 335c toward the bottom portion 333d of the second accommodating portion 333, and thus the gel supplied from the nozzle of the dispenser can be prevented from directly colliding with the bottom portion 333d and overflowing from the second accommodating portion 333.

In addition, the first deformable portion 350 includes the first resin portion 350a in contact with the second side wall surface 333b, and the second resin portion 350b being provided between the brush 323 and the first resin portion 350a and being harder than the first resin portion 350a. Furthermore, the first protrusion 336 is located on the commutator 312 side with respect to the end portion of the first resin portion 350a on the commutator 312 side. In addition, the end portion of the second resin portion 350b on the commutator 312 side is located on the commutator 312 side with respect to the end portion of the first resin portion 350a on the commutator 312 side.

In the present embodiment, the end portion of the first resin portion 350a on the commutator 312 side is supported by the second resin portion 350b, and thus the end portion of the first resin portion 350a on the commutator 312 side is prevented from moving toward the second resin portion 350b. As a result, in the motor 3, the first resin portion 350a can be prevented from flowing toward the commutator 312, and thus better electrical contact between the brush 323 and the commutator 312 can be achieved.

Furthermore, the second protrusion 337 is located on the commutator 312 side with respect to the end portion of the first deformable portion 350 on the commutator 312 side.

With this configuration, the end portion of the first deformable portion 350 on the commutator 312 side is supported by the second deformable portion 351 with the brush 323 interposed between the second deformable portion 351 and the end portion of the first deformable portion 350 on the commutator 312 side. As a result, the end portion of the first deformable portion 350 on the commutator 312 side can be prevented from moving toward the second deformable portion 351. Thus, in the motor 3, the first resin portion 350a can be prevented from flowing toward the commutator 312, and thus better electrical contact between the brush 323 and the commutator 312 can be achieved.

In addition, the second deformable portion 351 is provided between the first side wall surface 333a and the surface 323b of the brush 323 opposite to the contact surface 323a in contact with the commutator 312, and is more deformable with respect to the first deformable portion 350.

With this configuration, in the motor 3, the pressing force by the brush 323 against the commutator 312 can be prevented from increasing, and thus it is possible to dampen vibration of the brush 323 while reducing the contact resistance between the brush 323 and the commutator 312.

In addition, the third deformable portion 352 is formed so as to surround the end portion of the brush 323 on the side opposite to the commutator 312.

With this configuration, in the motor 3, the vibration of the brush 323 transmitted to the main body 321 can be dampened and thus better noise reduction can be achieved.

Each deformable portion 324 has a restoring force.

As a result, in the motor 3, the vibration of the brush 323 can be dampened and thus better noise reduction can be achieved.

Each deformable portion 324 is formed so as to be in contact with the second end portion 341 of the terminal portion 322 and the first side wall surface 333a, the second side wall surface 333b, and the third side wall surface 333c of the second accommodating portion 333.

With this configuration, in the motor 3, the vibration of the brush 323 transmitted to the main body 321 via the terminal portions 322 can be dampened and thus better noise reduction can be achieved.

Figure 12:
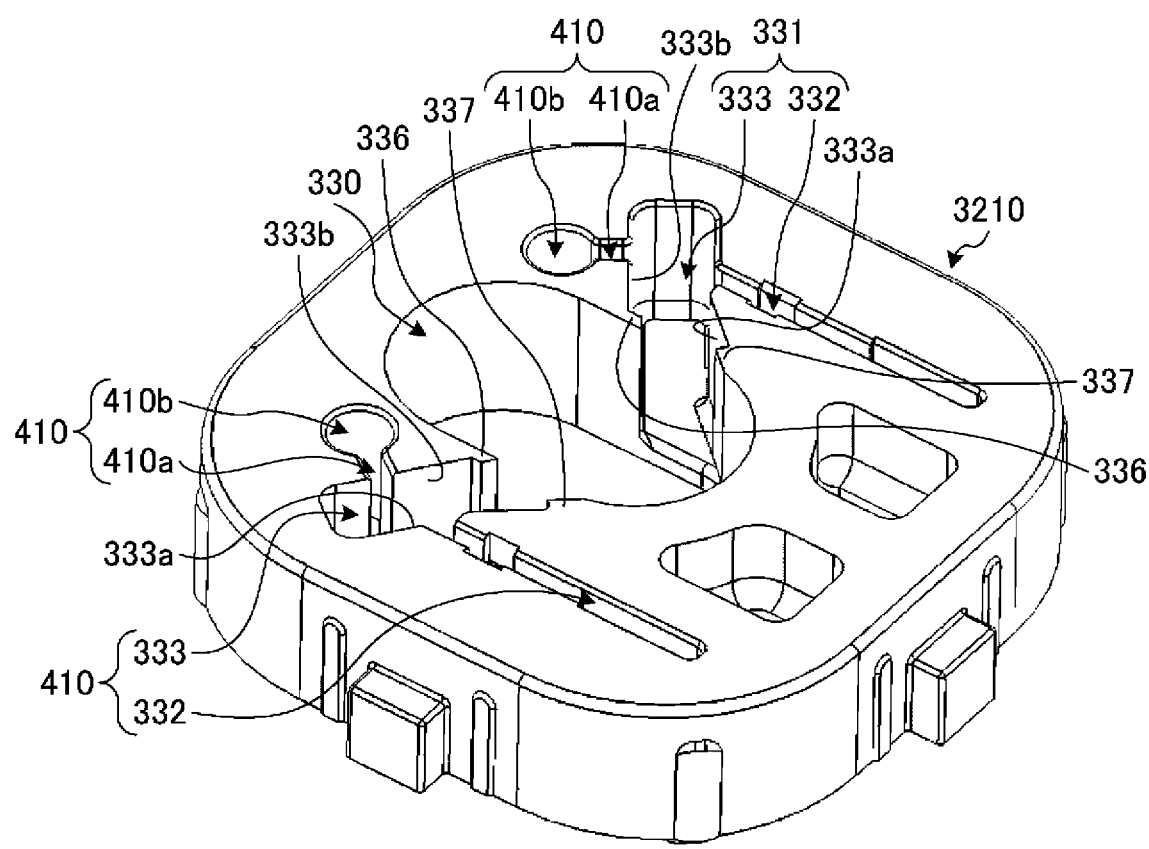
FIG. 12 is a perspective view of a bracket main body according to a modification.
Figure 13:
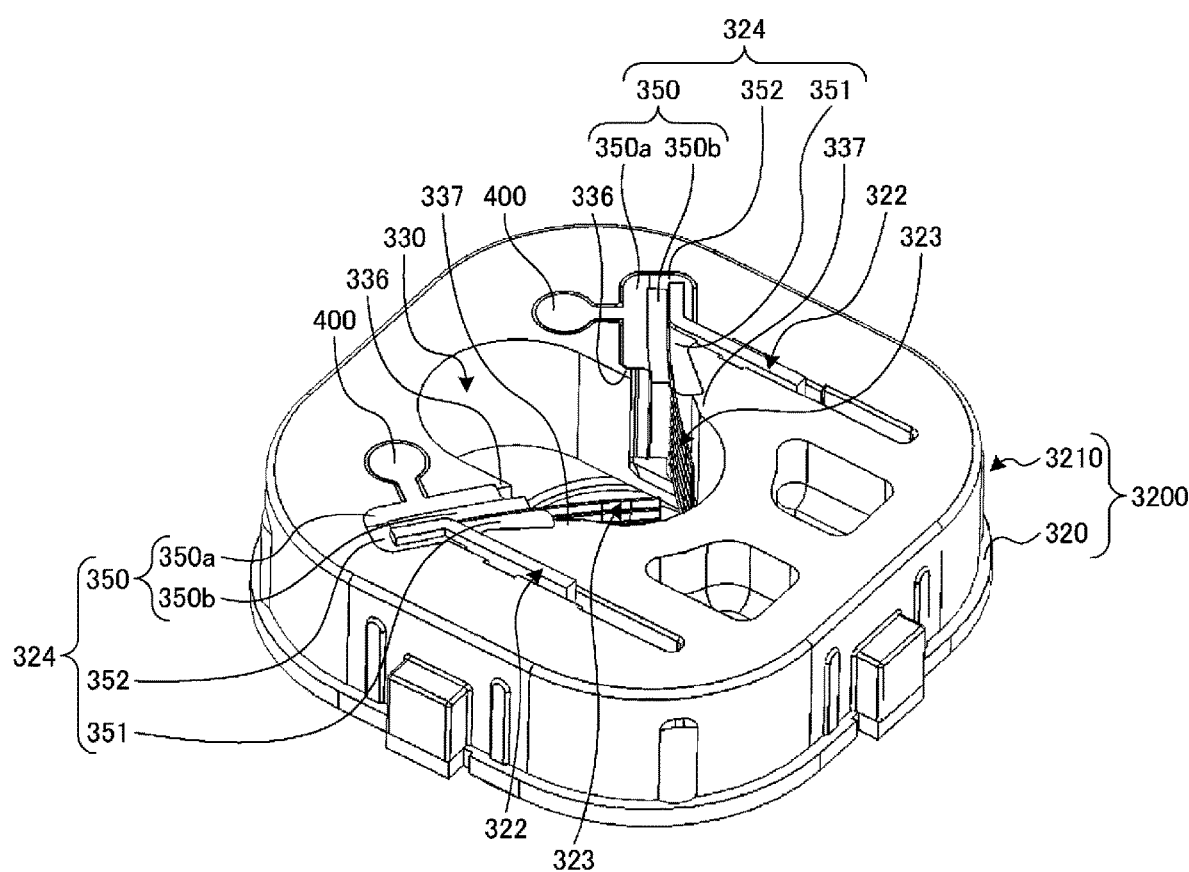
FIG. 13 is a perspective view of a bracket according to a modification.

The bracket main body 321 (main body 321) of a motor 10 may be a bracket main body 3210 (hereinafter, a main body 3210) illustrated in FIGS. 12 and 13. FIG. 12 is a perspective view of the bracket main body 3210 according to a modification, and FIG. 13 is a perspective view of a bracket 3200 according to the modification. In the following description, differences between the above-described main body 321 and the main body 3210 according to the modification and between the above-described bracket 32 and the bracket 3200 according to the modification will be described, and common elements will be referenced with the same reference signs and descriptions of these common elements will be omitted as appropriate.

The bracket 3200 includes the bearing plate 320, the pair of terminal portions 322, the pair of brushes 323, and the pair of deformable portions 324. Furthermore, the bracket 3200 includes the main body 3210 in place of the main body 321, and further includes a pair of resin portions 400.

The insertion hole 330 and the pair of accommodating portions 331 are formed in the main body 3210. The commutator 312 (see FIG. 6) is disposed in the insertion hole 330, and the terminal portions 322, portions of the brushes 323, and the deformable portions 324 are accommodated in the pair of accommodating portions 331. Furthermore, a pair of storage portions 410 for storing the pair of resin portions 400 are formed in the main body 3210.

Each of the accommodating portions 331 is formed of the first accommodating portion 332 and the second accommodating portion 333. The deformable portion 324 is accommodated in the second accommodating portion 333. Each deformable portion 324 includes the first deformable portion 350, the second deformable portion 351, and the third deformable portion 352. The first deformable portion 350 includes the first resin portion 350a and the second resin portion 350b. Each deformable portion 324 has a restoring force, and has a function of dampening vibration of the brush 323.

Similarly to the main body 321, the main body 3210 includes the first protrusion 336 and the second protrusion 337. The first protrusion 336 and the second protrusion 337 are formed at the end portion of the second accommodating portion 333 on the commutator 312 side. The first protrusion 336 and the second protrusion 337 are formed so as to oppose each other. The first protrusion 336 functions as a stopper for preventing the first resin portion 350a from flowing toward the commutator 312. The second protrusion 337 functions as a stopper for preventing the second deformable portion 351 from flowing toward the commutator 312.

Furthermore, in the main body 3210, a recess (hereinafter, referred to as a storage portion) 410 recessed away from the first side wall surface 333a is formed in the second side wall surface 333b of the second accommodating portion 333. The storage portion 410 includes a slit-like communication portion 410a formed in the second side wall surface 333b and a tubular third accommodating portion 410b in communication with the communication portion 410a, and thus the storage portion 410 communicates with the second accommodating portion 333. The communication portion forms a path or a passage.

The resin portions 400 stored in the storage portion 410 are each formed of the same gel as the first resin portion 350a. The gel is injected from a nozzle (not illustrated) of a dispenser inserted into the third accommodating portion 410b. As a result, the third accommodating portion 410b and the communication portion 410a are filled with the gel, and each resin portion 400 is formed. Then, the injection of the gel from the nozzle is continued, and as a result, the gel flows into the second accommodating portion 333 and forms the first resin portion 350a.

Each resin portion 400 functions as a supply source preventing the gel forming the first resin portion 350a from being depleted. In addition, when the vibration of the brush 323 is not sufficiently dampened by the first resin portion 350a, the resin portions 400 can dampen the residual vibration of the brush 323. Thus, the bracket 3200 according to the modification can ensure that the vibration of the brush 323 transmitted to the main body 3210 via the terminal portions 322 is dampened, and thus better noise reduction can be achieved.

Figure 14:
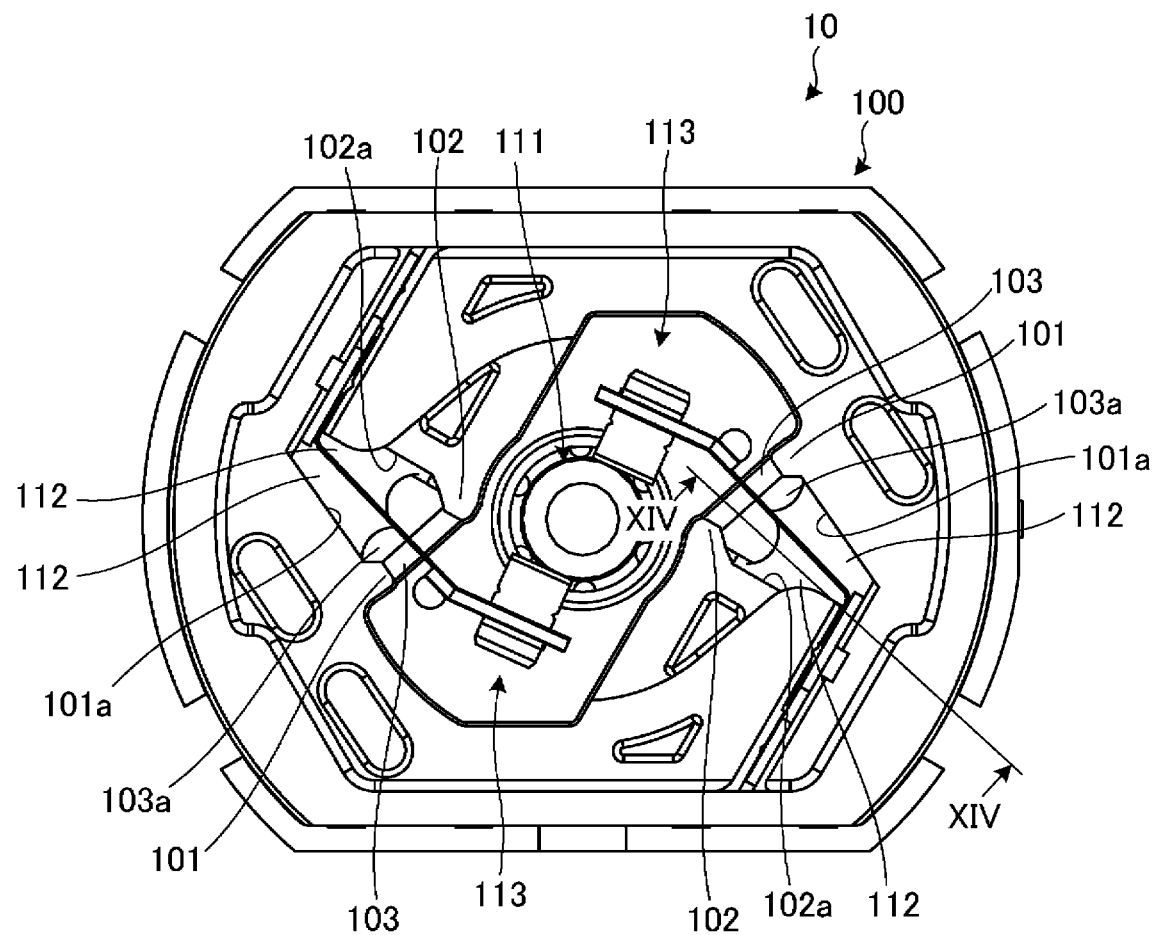
FIG. 14 is a front view of a motor according to a modification.
Figure 15:
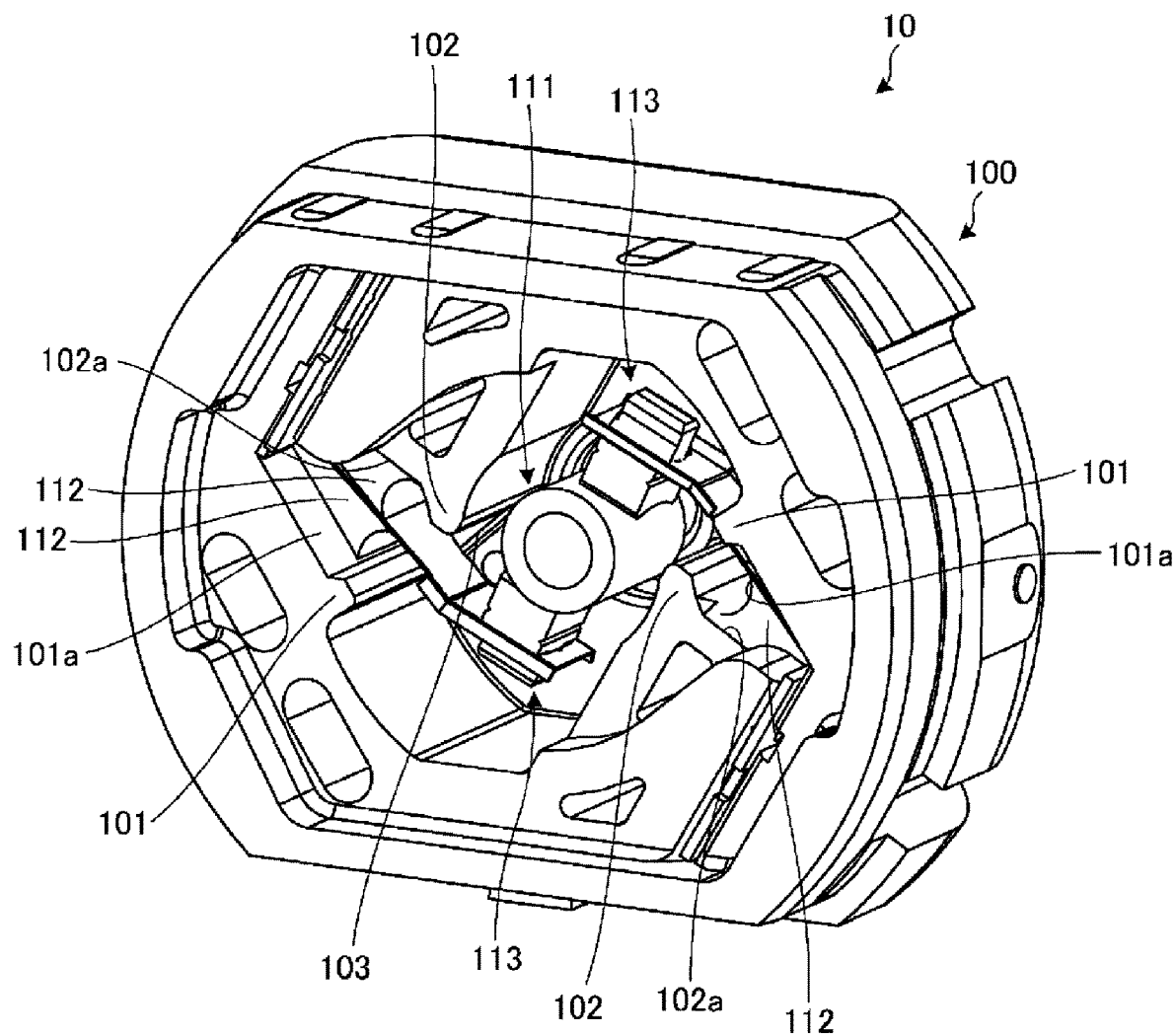
FIG. 15 is a perspective view of the motor according to a modification.
Figure 16:
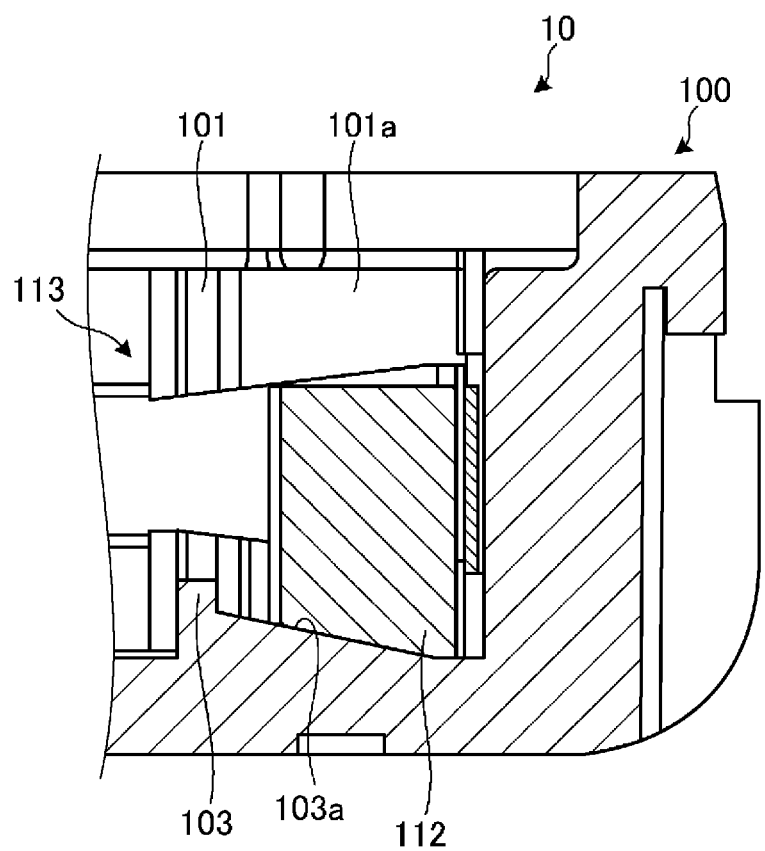
FIG. 16 is a cross-sectional view taken along XIV-XIV of FIG. 14.

Note that the motor 10 may be a motor including a pair of carbon brushes 113, as illustrated in FIGS. 14 to 16. FIG. 14 is a front view of the motor 10 according to a modification. FIG. 15 is a perspective view of the motor 10 according to the modification. FIG. 16 is a cross-sectional view taken along XIV-XIV of FIG. 14.

Specifically, a main body 100 of the motor 10 according to the modification includes first protrusions 101 and second protrusions 102, each protruding toward the brushes 113. Furthermore, the main body 100 of the motor according to the modification includes third protrusions 103 each protruding, toward the brushes 113, from a bottom portion 103a (bottom surface) connecting a first side wall surface 101a and a second side wall surface 102a. The first protrusions 101 protrude from the first side wall surface 101a, and the second protrusions 102 protrude from the second side wall surface 102a.

The third protrusion 103 is formed at an end portion of a second accommodating portion 110 on a commutator 111 side. The first protrusion 101, the second protrusion 102, and the third protrusion 103 are formed continuously. In other words, each third protrusion 103 is formed so as to connect the first protrusion 101 and the second protrusion 102.

Note that, the bottom portion 103a is an inclined surface inclined so as to increase in height toward the third protrusion 103. In other words, the bottom portion 103a is formed so as to decline from the third protrusion 103 side.

In the motor 10 according to the modification, a deformable portion 112 can be prevented from flowing toward the commutator 111 by the third protrusion 103. Thus, in the motor 10 according to the modification, better electrical contact between the brush 113 and the commutator 111 can be achieved.

Furthermore, the motor 100 according to the modification includes the bottom portion 103a increasing in height toward the third protrusion 103. As a result, in the motor 100 according to the modification, the deformable portion 112 can be further prevented from flowing toward the commutator 111. Thus, in the motor 10 according to the modification, even better electrical contact between the brush 113 and the commutator 111 can be achieved.

Note that the third protrusion may be provided in the motor 3 according to the embodiment described above.

The present invention is not limited to the embodiment described above. A configuration obtained by appropriately combining the above-mentioned constituent elements is also included in the present invention. Further effects and modifications can be easily derived by a person skilled in the art. Thus, a wide range of aspects of the present invention is not limited to the embodiment described above, and may be modified variously.

REFERENCE SIGNS LIST

1 Rotating device
3 Motor
4 Set of gears (gear mechanism)
30 Frame
31 Armature
32 Bracket
10 Motor
101 First protrusion
102 Second protrusion
103 Third protrusion 103a Bottom portion (bottom surface)
311 Rotation shaft
312 Commutator
320 Bearing plate
321 Bracket
322 Terminal portion
323 Brush
324 Deformable portion
331 Accommodating portion
332 First accommodating portion
333 Second accommodating portion
333a First side wall surface (second wall surface)
333b Second side wall surface (first wall surface)
333c Third side wall surface
335 Recess
335a Opening
335c Middle portion
336 First protrusion
337 Second protrusion
340 First end portion
341 Second end portion
342 Bent portion
350 First deformable portion
350a First resin portion
350b Second resin portion
351 Second deformable portion
352 Third deformable portion

The invention claimed is:
1. A motor, comprising:
a commutator provided to a rotation shaft;
a brush in contact with the commutator;
a bracket having a wall surface opposing the brush; and
a deformable portion in contact with the brush and the wall surface, the deformable portion including a resin portion, wherein
the bracket includes a protrusion on the commutator side with respect to the deformable portion, and
the protrusion protrudes from the wall surface toward the brush.
2. The motor according to claim 1, wherein
in a radial direction, the protrusion is in contact with an end portion of the deformable portion on the commutator side.
3. The motor according to claim 1, wherein
a recess is provided in a part of the wall surface in contact with the deformable portion.
4. The motor according to claim 3, wherein
the recess has a first end portion and a second end portion in an axial direction of the rotation shaft, the first end portion forming an opening of the bracket, and the second end portion forming an inclined surface.
5. The motor according to claim 3, wherein
in an axial direction of the rotation shaft, an end portion of the recess is located at a middle portion of a part of the wall surface.
6. The motor according to claim 1, wherein
the deformable portion includes:
the resin portion as a first resin portion in contact with the wall surface, and
a second resin portion provided between the brush and the first resin portion, the second resin portion being harder than the first resin portion,
an end portion of the second resin portion on the commutator side is located on the commutator side with respect to an end portion of the first resin portion on the commutator side, and
the protrusion is located on the commutator side with respect to the end portion of the first resin portion on the commutator side.
7. The motor according to claim 1, wherein
the deformable portion includes:
a first deformable portion provided between the brush and a first wall surface of the bracket opposing the brush, and
a second deformable portion provided between the brush and a second wall surface of the bracket opposing the first wall surface, and
the bracket includes:
a first protrusion protruding from the first wall surface toward the brush, the first protrusion being provided on the commutator side with respect to the first deformable portion, and
a second protrusion protruding from the second wall surface toward the brush, the second protrusion being provided on the commutator side with respect to the second deformable portion.
8. The motor according to claim 7, wherein
the second protrusion is located on the commutator side with respect to an end portion of the first deformable portion on the commutator side.
9. The motor according to claim 7, wherein
the second deformable portion is provided between the second wall surface and a surface of the brush opposite to a contact surface of the brush in contact with the commutator, the second deformable portion being more deformable with respect to the first deformable portion.
10. The motor according to claim 1, wherein
the deformable portion surrounds an end portion of the brush on a side opposite to the commutator.
11. The motor according to claim 1, wherein
the deformable portion has a restoring force.
12. The motor according to claim 1, comprising a terminal portion, wherein
the terminal portion includes:
a first end portion,
a second end portion attached with the brush, and
a bent portion formed between the first end portion and the second end portion,
the bracket includes an accommodating portion, the accommodating portion having the wall surface and accommodating the terminal portion, and
the deformable portion is in contact with the second end portion and the wall surface.
13. The motor according to claim 1, wherein
the bracket has a bottom surface connecting two wall surfaces each opposing the brush, and
the protrusion protrudes from each of the wall surfaces and the bottom surface toward the brush.
14. The motor according to claim 13, wherein
the bottom surface is an inclined surface inclined so as to increase in height toward the protrusion.
15. The motor according to claim 1, wherein
a lubricant being a member different from the resin portion is provided between the brush and the commutator.
16. A rotating device, comprising:
the motor according to claim 1;
a worm attached to the rotation shaft; and
a gear meshed with the worm.
17. The motor according to claim 1, wherein the resin portion includes a gel.

* * * * *